US008461280B2

(12) United States Patent
Eriksson et al.

(10) Patent No.: US 8,461,280 B2
(45) Date of Patent: *Jun. 11, 2013

(54) MULTI-STAGE PROCESS FOR PRODUCING MULTIMODAL LINEAR LOW DENSITY POLYETHYLENE POLYMERS

(75) Inventors: Virginie Eriksson, Helsinki (FI); Marjo Vaananen, Helsinki (FI); Markku Vahteri, Porvoo (FI); Thomas Garoff, Helsinki (FI); Petri Rekonen, Porvoo (FI); Jari Hatonen, Porvoo (FI); Siw Bodil Fredriksen, Skien (NO); Katrin Nord-Varhaug, Porsgrunn (NO); Marit Seim, Langesund (NO); Jorunn Nilsen, Porsgrunn (NO); Irene Helland, Langesund (NO)

(73) Assignee: Borealis Technology Oy, Porvoo (FI)

( * ) Notice: Subject to any disclaimer, the term of this patent is extended or adjusted under 35 U.S.C. 154(b) by 73 days.

This patent is subject to a terminal disclaimer.

(21) Appl. No.: 12/744,715

(22) PCT Filed: Dec. 5, 2008

(86) PCT No.: PCT/EP2008/010359
§ 371 (c)(1),
(2), (4) Date: Oct. 5, 2010

(87) PCT Pub. No.: WO2009/071324
PCT Pub. Date: Jun. 11, 2009

(65) Prior Publication Data
US 2011/0028665 A1 Feb. 3, 2011

(30) Foreign Application Priority Data

Dec. 5, 2007 (EP) .................... 07254717

(51) Int. Cl.
*C08F 110/02* (2006.01)
*C08F 110/08* (2006.01)
*C08F 4/42* (2006.01)

(52) U.S. Cl.
USPC ....... 526/352.2; 526/64; 526/348; 526/348.2; 526/348.6; 526/352; 502/103; 502/104; 502/117; 502/132

(58) Field of Classification Search
USPC ............. 502/103, 104, 117, 132; 526/64, 526/348, 348.2, 348.6, 352, 352.2
See application file for complete search history.

(56) References Cited

U.S. PATENT DOCUMENTS

| | | |
|---|---|---|
| 3,887,534 A | 6/1975 | Baba et al. |
| 4,234,624 A | 11/1980 | Linderoth et al. |
| 4,493,923 A | 1/1985 | McCullough, Jr. et al. |
| 4,508,872 A | 4/1985 | McCullough, Jr. et al. |
| 4,599,391 A | 7/1986 | Yamamoto et al. |
| 4,639,386 A | 1/1987 | Akao |
| 4,677,007 A | 6/1987 | Murray et al. |
| 4,696,979 A | 9/1987 | Shiga et al. |
| 4,871,819 A | 10/1989 | Oonishi et al. |
| 4,994,539 A | 2/1991 | Orikasa et al. |
| 5,047,468 A | 9/1991 | Lee et al. |
| 5,126,398 A | 6/1992 | Lee et al. |
| 5,286,540 A | 2/1994 | Suga et al. |
| 5,317,035 A | 5/1994 | Jacoby et al. |
| 5,457,016 A | 10/1995 | Dethlefs |
| 5,486,558 A | 1/1996 | Lee |
| 5,752,362 A | 5/1998 | Eichbauer et al. |
| 5,773,123 A | 6/1998 | Anwyll, Jr. |
| 6,265,055 B1 | 7/2001 | Simpson et al. |
| 6,291,590 B1 | 9/2001 | Sainio et al. |
| 6,440,509 B1 | 8/2002 | Littlejohn et al. |
| 6,503,637 B1 | 1/2003 | Van Loon |
| 6,559,232 B2 | 5/2003 | Inoue et al. |
| 6,573,334 B1 | 6/2003 | Pitteri et al. |
| 6,583,241 B1 | 6/2003 | Beach et al. |
| 6,733,717 B1 | 5/2004 | Marczinke et al. |
| 6,770,714 B2 | 8/2004 | Ommundsen et al. |
| 2002/0132950 A1 | 9/2002 | Smith et al. |
| 2005/0161866 A1 | 7/2005 | Batlaw et al. |
| 2005/0200046 A1 | 9/2005 | Breese |
| 2005/0234217 A1 | 10/2005 | Bigiavi et al. |
| 2006/0142495 A1 | 6/2006 | Lalho et al. |
| 2007/0191531 A1 | 8/2007 | Gaschlet et al. |
| 2007/0249763 A1* | 10/2007 | Hagerty et al. ............ 524/81 |
| 2007/0275850 A1* | 11/2007 | Brita et al. ............... 502/152 |
| 2008/0276717 A1 | 11/2008 | Teh et al. |
| 2010/0003435 A1 | 1/2010 | Jaaskelainen et al. |
| 2010/0009156 A1 | 1/2010 | Daviknes et al. |
| 2010/0304062 A1 | 12/2010 | Daviknes et al. |
| 2011/0028665 A1 | 2/2011 | Eriksson et al. |

(Continued)

FOREIGN PATENT DOCUMENTS

| | | |
|---|---|---|
| CN | 1676545 | 10/2005 |
| DE | 108546 | 9/1974 |

(Continued)

OTHER PUBLICATIONS

Chen, European Polymer Journal, 42 (2006) 2441-2449.*

(Continued)

*Primary Examiner* — Robert C Boyle
(74) *Attorney, Agent, or Firm* — Gardner Groff Greenwald & Villanueva, PC

(57) ABSTRACT

A multimodal linear low density polyethylene polymer having a final density of 900 to 940 kg/m$^3$, and containing at least one α-olefin comonomer in addition to ethylene comprising: (A) 30 to 60 wt % of a lower molecular weight component being an ethylene homopolymer or a copolymer of ethylene and at least one α-olefin; and (B) 70 to 40 wt % of a higher molecular weight component being a copolymer of ethylene and at least one α-olefin, said α-olefin being the same or different from any α-olefin used in component (A) but with the proviso that both components (A) and (B) are not polymers of ethylene and butane alone; wherein the multimodal LLDPE has a dart drop of at least 700 g; and wherein components (A) and (B) are obtainable using a Ziegler-Natta catalyst.

8 Claims, No Drawings

U.S. PATENT DOCUMENTS

| | | |
|---|---|---|
| 2011/0132864 A1 | 6/2011 | Jamtvedt et al. |
| 2011/0162869 A1 | 7/2011 | Smedberg |
| 2011/0168427 A1 | 7/2011 | Smedberg et al. |
| 2011/0180304 A1 | 7/2011 | Smedberg et al. |
| 2011/0290529 A1 | 12/2011 | Pakkanen |

FOREIGN PATENT DOCUMENTS

| | | | |
|---|---|---|---|
| EP | 0111602 | | 6/1984 |
| EP | 0146270 | | 6/1985 |
| EP | 0151883 | | 8/1985 |
| EP | 0184362 | | 6/1986 |
| EP | 0251340 | | 1/1988 |
| EP | 0260791 | | 3/1988 |
| EP | 0309138 | | 3/1989 |
| EP | 0463402 | | 1/1992 |
| EP | 0517868 | | 7/1992 |
| EP | 0585585 | | 9/1992 |
| EP | 0688794 | * | 12/1995 |
| EP | 0691367 | | 1/1996 |
| EP | 0735090 | | 10/1996 |
| EP | 0778289 | | 6/1997 |
| EP | 0903356 | | 3/1999 |
| EP | 0928797 | | 7/1999 |
| EP | 0949274 | | 10/1999 |
| EP | 1333044 | * | 2/2002 |
| EP | 1170329 | | 9/2002 |
| EP | 1333044 | | 8/2003 |
| EP | 1375528 | | 1/2004 |
| EP | 1488924 | | 12/2004 |
| EP | 1655334 | | 5/2006 |
| EP | 1674238 | | 6/2006 |
| EP | 1712574 | | 10/2006 |
| JP | 7238204 | | 9/1995 |
| JP | 10036581 | | 10/1995 |
| JP | 2000178404 | | 6/2000 |
| JP | 2003138074 | | 5/2003 |
| JP | 2004182955 | | 7/2004 |
| WO | 9308222 | | 4/1993 |
| WO | 9413707 | | 6/1993 |
| WO | 9523829 | | 9/1995 |
| WO | 9706951 | | 2/1997 |
| WO | 9750093 | | 12/1997 |
| WO | 9924478 | | 5/1999 |
| WO | 9924479 | | 5/1999 |
| WO | 9964509 | | 12/1999 |
| WO | 9965039 | | 12/1999 |
| WO | 0032695 | | 6/2000 |
| WO | 0071615 | | 11/2000 |
| WO | 0202323 | | 1/2002 |
| WO | 0231046 | | 4/2002 |
| WO | 0236672 | | 5/2002 |
| WO | 02038383 | | 8/2002 |
| WO | 02086916 | | 10/2002 |
| WO | 03000740 | | 1/2003 |
| WO | 03066699 | | 1/2003 |
| WO | 03020821 | | 3/2003 |
| WO | 03064519 | | 8/2003 |
| WO | 03106510 | | 12/2003 |
| WO | 2004000902 | | 12/2003 |
| WO | 2004067654 | | 8/2004 |
| WO | 2005009714 | | 2/2005 |
| WO | 2005014680 | | 5/2005 |
| WO | 2005074428 | | 8/2005 |
| WO | 2005103132 | | 11/2005 |
| WO | 2006037603 | | 4/2006 |
| WO | 2006053740 | | 5/2006 |
| WO | 2006065799 | | 6/2006 |
| WO | WO 2006/108512 | * | 10/2006 |
| WO | 2006131266 | | 12/2006 |
| WO | 2007022908 | | 3/2007 |
| WO | 2007042217 | | 4/2007 |
| WO | 2007071445 | | 6/2007 |
| WO | 2007071447 | | 6/2007 |
| WO | 2008074493 | | 12/2007 |
| WO | 2008009393 | | 1/2008 |
| WO | 2010003649 | | 1/2010 |
| WO | 2010003651 | | 1/2010 |
| WO | 2010047743 | | 4/2010 |
| WO | 2011038886 | | 4/2011 |
| WO | 2011092263 | | 8/2011 |
| WO | 2011092264 | | 8/2011 |

OTHER PUBLICATIONS

International Search Report, dated Jan. 29, 2009 (PCT/US2008/010359).
Adebi J App Polym Sci vol. 101, 1456-1462, 2006.
Atofina Polypropylene Random Copolymers product range Jun. 2003.
Borealis Brochure, 2005.
Borealis Caps and Closures brochure 2007.
Brostar Heavy Duty Shipping Sacks (K IN0031/GB FF 2007 10, Borealis AG/Borouge AG/Borouge Pte Ltd.).
Brostar PE for blown film applications (K IN0052/GB FF 2007 10 BB, Borealis AG/Borouge AG/Borouge Pte Ltd.).
Certificate of analysis 3510368, May 6, 2007.
Datasheet 1124 2002.
Datasheet 1125 2001.
Declaration by Mr Nieber 2011.
English Abstract for Chinese application No. 1676545 published Oct. 5, 2005.
International Search Report dated Apr. 2, 2010 for international application No. PCT/EP20091063251.
International Search Report dated Nov. 12, 2009 for international application No. PCT/EP2009/004929.
International Search Report dated Nov. 12, 2009 for international application No. PCT/EP2009/004931.
International Search Report dated Oct. 15, 2009 for international application No. PCT/US2009/004930.
Invoice 26932717 2007.
Letter of Plastics Enterprises Co, Ltd—Ed Callahan 2011.
List of deliveries 2005.
Lot Analytical data 2007.
MDO Film Oreintated PE and PP Packaging film (2004 Borealis A/S; IN0128/GB FF 2004 10).
Moore et al., Polypropylene Handbook, Hanser Publishers, 1996.
Myhre er al., Oreintated PE films; Expanding Oppurtunities with Brostar PE; Maack Specialty 2001.
Office Action dated Feb. 23, 2011 for Chinese application No. 200780040208.4.
Office Action dated May 30, 2011 for Chinese application No. 200880102737.7.
Polypropylene European Product range Sep. 2006.
Press release RE450MO 2007.
Product specs for 62220CM 2005.
Production Spec for 62220-ORG 2005.
Public use evidence for DR7021 in Pringles lids: Declaration by Wilson 2011.
Tice—ILSI Europe Report Series 2002.
Total Petrochemicals Polypropylene PPR7220 2005.
Written Opinion dated Mar. 11, 2008 for international application No. PCT/EP2007/009918.
International Search Report dated Mar. 17, 2011 for international application No. PCT/EP2011/051172.
Written Opinion dated Mar. 17, 2011 for international application No. PCT/EP2011/051172.
International Search Report dated Mar. 17, 2011 for international application No. PCT/EP2011/051173.
Written Opinion dated Mar. 17, 2011 for international application No. PCT/EP2011/051173.

* cited by examiner

MULTI-STAGE PROCESS FOR PRODUCING MULTIMODAL LINEAR LOW DENSITY POLYETHYLENE POLYMERS

IN THE CROSS-REFERENCE TO RELATED APPLICATIONS

This application claims priority to European Application No. 07254717.7, filed Dec. 5, 2007, which is hereby incorporated herein by reference in its entirety for all purposes.

This invention relates to a multimodal linear low density polymer suitable for the manufacture of films which possess excellent impact properties as well as to films and other articles made from the polymer. The polymer can be used to form monolayer films or a single layer in a multilayer film, e.g. a cast film or blown film. Further the invention relates to a process for producing the polymers as well to polymers having some special improved features.

Over the past ten years there has been a rapid growth in the market for linear low density polyethylene (LLDPE). A broad range of LLDPE's are now used in injection molding, rotational molding, blow molding, pipe, tubing, and wire and cable applications. LLDPE has essentially a linear backbone with only short chain branches, usually about 3 to 10 carbon atoms in length. In LLDPE, the length and frequency of branching, and, consequently, the density, is controlled by the type and amount of comonomer and the catalyst type used in the polymerization.

Many LLDPE resins typically incorporate 1-butene or 1-hexene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPEs manufactured today are used in film products where the excellent physical properties and drawdown characteristics of LLDPE film makes them well suited for a broad spectrum of applications. LLDPE films are often characterized by excellent tensile strength, high ultimate elongation, good impact strength, and excellent puncture resistance.

These properties, together with toughness, are enhanced by increasing the molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

The blending of polymers is successfully achieved in a staged reactor process such as those described in U.S. Pat. Nos. 5,047,468 and 5,126,398 but while the in situ blends prepared as above and the films produced therefrom are found to have the advantageous characteristics heretofore mentioned, industry continues to seek films with characteristics tailored to particular applications.

WO03/066699 describes films formed from an in situ blend of two polymer components in which a metallocene catalyst is used to manufacture the polymer. The films are said to have excellent sealing properties.

WO2005/014680 describes further in situ multimodal LLDPE polymers which have applications in injection moulding. The polymers are again manufactured using metallocene catalysis.

In EP-A-778289 a two stage tandem reactor process is described for the formation of a multimodal polymer. Ziegler-Natta catalysis is employed but the LMW component is typically a homopolymer or substantially a homopolymer.

In WO03/020821, multimodal LLDPE polymers are also described. The LLDPE's are generally made using particular constrained geometry metallocene catalysts and are for use in pipe manufacture.

The present inventors sought new multimodal polymers and films made therefrom that possess particularly good impact properties without compromising processability. This allows, for example, the formation of strong films with lower material cost. The films should also possess good tear strength.

The present inventors have now prepared a new polymer with remarkably high impact strength as well as excellent tear resistance which also possesses desirable processability. Good processability means, in general, higher output with less energy needed.

Thus, viewed from one aspect the invention provides a multimodal linear low density polyethylene polymer having a final density of 900 to 940 $kg/m^3$, and containing at least one $\alpha$-olefin comonomer in addition to ethylene comprising:

(A) 30 to 60 wt % of a lower molecular weight component being an ethylene homopolymer or a copolymer of ethylene and at least one $\alpha$-olefin; and (B) 70 to 40 wt % of a higher molecular weight component being a copolymer of ethylene and at least one $\alpha$-olefin, said $\alpha$-olefin being the same or different from any $\alpha$-olefin used in component (A) but with the proviso that both components (A) and (B) are not polymers of ethylene and butene alone;

wherein the multimodal LLDPE has a dart drop of at least 700 g (measured as defined below);

and wherein components (A) and (B) are obtainable using a Ziegler-Natta catalyst. Preferably said Ziegler-Natta catalyst comprises a solid, catalyst component formed at least from (a) a compound of group 1 to 3 of the periodic table;
(b) a transition metal compound of group 4 to 10 of the periodic table or an actinide or lanthanide;
(d) a compound of group 13 of the periodic table;

wherein the catalyst component of said Ziegler Natta catalyst is formed by an emulsion/solidification method, and is optionally modified by (c) one or more organic ligand compounds which are selected from organic compounds comprising a cyclopentadienyl anion backbone.

Viewed from another aspect the invention provides a process for the manufacture of a multimodal LLDPE as hereinbefore described comprising:

in a first stage polymerising ethylene and optionally at least one $\alpha$-olefin so as to form 30 to 60 wt % of a lower molecular weight component and;

transferring the product of the first stage to a second stage and in a second stage polymerising ethylene and at least one $\alpha$-olefin to form 70 to 40 wt % of a higher molecular weight component;

wherein components (A) and (B) are obtainable using a Ziegler-Natta catalyst preferably comprising a solid, ligand modified catalyst component formed at least from (a) a compound of group 1 to 3 of the periodic table;
(b) a transition metal compound of group 4 to 10 of the periodic table or an actinide or lanthanide;
(d) a compound of group 13 of the periodic table;

wherein the catalyst component of said Ziegler Natta catalyst is formed by an emulsion/solidification method, and is optionally modified by (c) one or more organic ligand compounds which are selected from organic compounds comprising a cyclopentadienyl anion backbone.

Viewed from another aspect the invention provides a composition comprising a multimodal linear low density polymer as hereinbefore described.

Viewed from another aspect the invention provides an article, preferably a film comprising a multimodal linear low density polymer as hereinbefore described.

Viewed from another aspect the invention provides use of a film as hereinbefore described in packaging as well as an article packaged using said film.

For the avoidance of doubt, by a multimodal polymer having a dart drop of at least 700 g is meant that when said multimodal polymer is formulated as a film of thickness 40 µm following the protocol set out in the film preparation example, the dart drop of the formed film when measured using ISO 7765-1, method "A" (A dart with a 38 mm diameter hemispherical head is dropped from a height of 0.66 m onto a film clamped over a hole. If the specimen fails, the weight of the dart is reduced and if it does not fail the weight is increased. At least 20 specimens are tested. The weight resulting in failure of 50% of the specimens is calculated), a value of at least 700 g is obtained.

The proviso above requires that both components (A) and (B) are not polymers of ethylene and butene alone. Whilst components (A) and (B) can both comprise butene as a comonomer, this is only possible where one or other or both of the components also contains an additional α-olefin comonomer. Both components cannot be simply be a polymer of ethylene and butene as the only monomer units present.

Properties of the Multimodal LLDPE

This invention relates to a multimodal linear low density polyethylene having at least two components, a lower molecular weight component (A) and a higher molecular weight component (B).

The multimodal LLDPE polymer of the invention should have a density of 900 to 940 kg/m$^3$, preferably less than 935 kg/m$^3$, e.g. 905-939 kg/m$^3$, preferably in the range of from 910 to 930 kg/m$^3$, such as 910 to 925 kg/m$^3$, (ISO 1183-1: 2004 "Immersion method").

The MFR$_5$ of the multimodal LLDPE is in the range 0.05 to 10 g/10 min, preferably 0.1 to 5 g/10 min, e.g. 0.5-3 g/10 min, especially 0.8 to 3 g/10 min (ISO 1133, 190° C./min, 5.0 kg load)

The MFR$_{21}$ for multimodal LLDPE should be in the range 5 to 150, preferably 10 to 100 g/10 min, e.g. 15 to 70 g/10 min (ISO 1133, 190° C./min, 21.6 kg load).

The Mw of multimodal LLDPE should be in the range 100,000 to 400,000, preferably 130,000 to 300,000. The Mn should be in the range 5000 to 35,000, preferably 8,000 to 25,000. The Mw/Mn for multimodal LLDPE should be in the range 5 to 25, e.g. 7 to 22.

The multimodal LLDPE of the invention possesses a low xylene soluble fraction (XS). The XS may be less than 20 wt %, measured as defined in experimental part, e.g. less than 15 wt %, especially less than 10 wt %.

The multimodal LLDPE may formed from ethylene along with at least one other α-olefin comonomer, preferably at least one C3-12 α-olefin comonomer, more preferably at least one C4-12 α-olefin comonomer, e.g. 1-butene, 1-hexene or 1-octene. The HMW component can contain at least one comonomer which is the same as one employed in the LMW component but both components cannot be polymers of ethylene and butene alone. It is possible for both components to be polymers of ethylene and hexene (or ethylene and octene and so on) although it will be appreciated that both components are different even if the same comonomer is used in both components. By definition for example, the molecular weight of the two components must be different.

Preferred comonomer combinations include (LMW/HMW) butene/hexene, hexene/butene and hexene/hexene.

According to a preferred embodiment, the multimodal LLDPE is a terpolymer, i.e. the polymer contains ethylene and two comonomers. Preferably, the HMW component contains at least one comonomer which is different from that employed in the LMW component. In a still further embodiment, the HMW component comprises the same comonomer as used in the LMW component and additionally a comonomer different from and preferably heavier than that used in the LMW component.

The amount of comonomer present in the multimodal LLDPE as a whole is preferably 1 to 20 wt %, e.g. 2 to 15% wt % relative to ethylene, especially 5 to 13 wt %. Preferably the 1-hexene content of the LLDPE of the invention is less than 8 mol %. Ideally, the butene content of the multimodal polymer of the invention is less than 5 mol %, more preferably less than 4 mol %, e.g., determined by $C^{13}$ NMR.

As noted above, the multimodal LLDPE of the invention comprises at least a lower molecular weight component (LMW) and a higher molecular weight (HMW) component.

Usually, a polyethylene, e.g. LLDPE composition, comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer, e.g. LLDPE, will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

The LMW component has a lower molecular weight than the higher molecular weight component. Preferably there may be a difference in molecular weight of at least 1000, preferably at least 5000, especially at least 20,000 between components.

The multimodal LLDPE of the invention is preferably bimodal or trimodal, especially bimodal.

LMW Component

The lower molecular weight component of the multimodal LLDPE preferably has a MFR$_2$ of at least 50, preferably at least 100 g/10 min, preferably 110 to 3000 g/10 min, e.g. 110 to 500 g/10 min. The molecular weight of the low molecular weight component should preferably range from 15,000 to 50,000, e.g. 20,000 to 40,000.

It is preferred if the Mw/Mn of the LMW component is in the range 3 to 10, e.g. 5 to 8.

The density of the lower molecular weight component may range from 930 to 980 kg/m$^3$, e.g. 940 to 970 kg/m$^3$ preferably 945 to 965 kg/m$^3$, especially 947 to 955 kg/m$^3$. It is a feature of the invention that the density of the LMW component is comparatively low for a multimodal polymer.

The lower molecular weight component should preferably form 30 to 60 wt %, e.g. 30 to 55% by weight, especially 35 to 50 wt %, most especially 40 to 48 wt % of the multimodal LLDPE. It is preferred therefore if the HMW component is the larger component present.

The lower molecular weight component can be an ethylene homopolymer (i.e. where ethylene is the only monomer present) but is preferably an ethylene copolymer, especially where only one comonomer is present. Especially preferably it is a copolymer of ethylene and 1-butene or 1-hexene.

The comonomer content in the LMW component is preferably kept as low as possible as low comonomer content in the LMW component has been found to be associated with improvements in impact properties, but also in tear resistance. Comonomer contents of the order of less than 10 wt % are appropriate, preferably less than 8 wt %, especially less than 3 wt %. (by $C^{13}$ NMR).

HMW Component

The higher molecular weight component should have a lower density than the lower molecular weight component.

The higher molecular weight component should have a density of less than 915 $kg/m^3$, e.g. less than 913 $kg/m^3$, preferably less than 912 $kg/m^3$, especially less than 910 $kg/m^3$. It is a feature of the invention that the HMW component possesses a very low density.

This combination of features is believed to improve the processability of the polymers of the invention making them, for example, easy to extrude on a film line and hence capable of increased film line output.

The Mw of the higher molecular weight component may range from 100,000 to 1,000,000, preferably 150,000 to 500,000.

It is preferred if the Mw/Mn of the HMW component is in the range 3 to 10, e.g. 5 to 8.

The higher molecular weight component forms 70 to 40 wt %, e.g. 68 to 45% by weight, more preferably 67 to 50, especially 65 to 52 wt % of the multimodal LLDPE.

The higher molecular weight component is preferably an ethylene copolymer, in particular a binary copolymer (i.e. where only one comonomer is present) or a terpolymer (with two comonomers).

Especially preferably the HMW component is a binary copolymer of ethylene and hexene or a terpolymer of ethylene, 1-butene and 1-hexene or 1-octene. In a preferred embodiment the HMW component contains at least one α-olefin which is not present in the LMW component. Where the LMW component is a homopolymer then in a further preferred embodiment, the HMW component contains at least 2 α-olefin comonomers.

The amount of comonomer present in the HMW component may range from 1 to 6 wt %, e.g. 2 to 5 wt %, especially 3 to 5 wt %. It should be noted that comonomer amounts in HMW component can not be measured directly (in a process where the HMW component is formed second in a multistage process), but may be calculated based on the amount of the LMW component present and of the final polymer as well as knowledge of the production split.

Further Components of the Multimodal Polymer

The multimodal LLDPE may comprise other polymer components over and above the LMW and HMW components. For example, the polymer may contain up to 10% by weight of a polyethylene prepolymer (obtainable from a prepolymerisation step as well known in the art). In case of such prepolymer, the prepolymer component may be comprised in one of LMW and HMW components, preferably LMW component, as defined above. It is preferred however if no prepolymerisation step is employed.

Further Properties

The polymer of the invention exhibits very high dart drop measured according to the method as described below. Thus for a 40 μm film of the invention prepared as described in the film blowing example below, Dart drop F50 (ISO 7765/1) may be at least 700 g, preferably at least 750 g, more preferably at least 800 g, especially at least 900 g. Some polymers of the invention exhibit dart drop values of over 1000 g.

In another embodiment, the dart drop F50 value should be at least 700 g for any film formed from a polymer of the invention having a thickness of 10 μm or more.

In another embodiment the ratio of the dart drop F50 value to film thickness should be at least 17.5 g/μm, preferably at least 20 g/μm, more preferably 22.5 g/μm, especially 25 g/μm.

Thus, viewed from another aspect the invention provides a multimodal linear low density polyethylene polymer having a final density of 900 to 940 $kg/m^3$, and containing at least one α-olefin comonomer in addition to ethylene comprising:

(A) 30 to 60 wt % of a lower molecular weight component being an ethylene homopolymer or a copolymer of ethylene and at least one α-olefin; and (B) 70 to 40 wt % of a higher molecular weight component being a copolymer of ethylene and at least one α-olefin, said α-olefin being the same or different from any α-olefin used in component (A) but with the proviso that both components (A) and (B) are not polymers of ethylene and butene alone;

wherein the multimodal LLDPE has dart drop F50 value to film thickness should of at least 17.5 g/μm, and wherein components (A) and (B) are obtainable using a Ziegler-Natta catalyst.

The multimodal LLDPE polymer of the invention also exhibits excellent tear resistance, especially in the machine direction. Thus for a 40 μm film of the invention prepared as described in the film blowing example below tear resistance in the machine direction may be at least 1N, preferably at least 1.5N, especially at least 2N.

Manufacture

Multimodal LLDPE polymers may be prepared in general for example by two or more stage polymerization or by the use of two or more different Ziegler Natta catalysts in a one stage polymerization. It is important, however, to ensure that the higher and lower molecular weight components are intimately mixed prior to extrusion. This is most advantageously achieved by using a multistage process.

Preferably the multimodal LLDPE is produced in a two-stage polymerization using the same Ziegler-Natta catalyst in both steps. Two-stage polymerisation can be carried out in one reactor or e.g. in two different reactors. In the latter case e.g. two slurry reactors or two gas phase reactors could be employed. Preferably however, the multimodal LLDPE is made using a slurry polymerization in a loop reactor followed by a gas phase polymerization in a gas phase reactor.

A loop reactor—gas phase reactor system is marketed by Borealis as a BORSTAR reactor system. Any multimodal LLDPE of the invention is preferably formed in a two stage process comprising a first slurry loop polymerisation followed by gas phase polymerisation.

The conditions used in such a process are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

Preferably, the lower molecular weight polymer fraction is produced in a continuously operating loop reactor where ethylene is polymerised in the presence of comonomer(s) (if desired), a Ziegler Natta polymerization catalyst with conventional cocatalysts, i.e. compounds of Group 13 metal, like Al alkyl compounds, and a chain transfer agent such as hydrogen. The diluent is typically an inert aliphatic hydrocarbon, preferably isobutane or propane. Preferably the C4/C2 ratio in the first stage is 200 to 600 mol/kmol.

The hydrogen feed may be of the order of 50 to 150 g/h.

The higher molecular weight component can then be formed in a gas phase reactor using the same catalyst.

The split between the two components has importance. Whilst higher concentrations of HMW component increase the dart drop, it becomes more difficult to run a process for the manufacture of the polymer when the proportion of HMW component becomes too high. It is a feature of the invention that high dart drop values can be achieved at conventional LMW/HMW split ratios.

Where the HMW component is made as a second step in a multistage polymerisation it is not possible to measure its properties directly. However, e.g. for the above described polymerisation process of the present invention, the density, $MFR_2$ etc of the HMW component can be calculated using Kim McAuley's equations. Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835. The density is calculated from McAuley's equation 37, where final density and density after the first reactor is known. $MFR_2$ is calculated from McAuley's equation 25, where final $MFR_2$ and $MFR_2$ after the first reactor is calculated.

All components of the multimodal LLDPE of the invention are preferably made using a Ziegler Natta catalyst comprising a solid, ligand modified catalyst component formed at least from (a) a compound of group 1 to 3 of the periodic table (b) a transition metal compound of group 4 to 10 of the periodic table or an actinide or lanthanide (c) one or more organic ligand compounds which are selected from organic compounds comprising a cyclopentadienyl anion backbone and (d) a compound of group 13 of the periodic table;

wherein the catalyst component of said Ziegler Natta catalyst is formed by an emulsion/solidification method.

Whilst different catalysts falling within this definition may be used to form the individual components of the multimodal LLDPE, it will be appreciated that preferably the same catalyst is used to form both components.

In general no external support is used in the manufacture of this type of catalyst.

The organic ligand (c) of the Ziegler-Natta catalyst originates from a compound having an organic ligand anion. The cationic part is preferably a metal, i.e. the compounds preferably are metal salts of organic anions. The metals preferably are metals of Group 1 or 2, preferably Mg and Li metals, i.e. the compounds to be used in ligand modifying of the catalysts are preferably Li or Mg salts of organic ligand anions.

The organic ligand anion comprises a cyclopentadienyl hydrocarbon back-bone, which may contain heteroatoms such as N, P, O, S etc.

Said cyclopentadienyl hydrocarbon backbone can be a part of a fused hydrocarbon ring system. As examples of that type of ring systems can mentioned e.g. pentalenyl, indenyl, atsulenyl, indasenyl, asenaphtylenyl or fluorenyl compounds. All hydrocarbons backbones can be in substituted or unsubstituted form. For example, the organic ligand anion may be a substituted or unsubstituted cyclopentadienyl, a substituted or unsubstituted indenyl or a substituted or unsubstituted fluorenyl compound.

The optional one or more substituent(s), are independently selected preferably from halogen, hydrocarbyl, e.g. C1-20-alkyl, C2-20-alkenyl, C2-20-alkynyl, C3-12-cycloalkyl, C6-20-aryl or C7-20-arylalkyl, C3-12-cycloalkyl which contains 1, 2, 3 or 4 heteroatom(s) in the ring moiety, C6-20-heteroaryl, C1-20-haloalkyl, —SiR"$_3$, —OSiR"$_3$, —SR", —PR"$_2$ or —NR"$_2$, each R" is independently a hydrogen or hydrocarbyl, e.g. C1-20-alkyl, C2-20-alkenyl, C2-20-alkynyl, C3-12-cycloalkyl or C6-20-aryl; or e.g. in case of —NR"$_2$, the two substituents R" can form a ring, e.g. five- or six-membered ring, together with the nitrogen atom wherein they are attached to.

Examples of the organic ligand anions comprise cyclopolyenyls or substituted cyclopolyenyls having 5 to 24 carbon atoms such as cyclopentadienyl, methylcyclopentadienyl, ethylcyclopentadienyl, t-butylcyclopentadienyl, hexylcyclopentadienyl, octylcyclopentadienyl, 1,2-dimethylcyclopentadienyl, 1,3-dimethylcyclopentadienyl, 1,2,4-trimethylcyclopentadienyl, 1,2,3,4-tetramethylcyclopentadienyl, pentamethylcyclopentadienyl, indenyl, 4-methyl-1-indenyl, 4,7-dimethylindenyl, 4,5,6,7-tetrahydroindenyl, fluorenyl or methylfluorenyl, 2,3-dimethyl-dimethyl-t-butyl-siloxycyclopentadienyl.

Specific examples of useful Mg and Li ligand compounds are biscyclopentadienylMg, cyclopentadienylLi, indenylLi, 3,4-dimethyl-t-butyl-siloxycyclopentadienyl and fluorenylLi ligand compounds. Li ligands are preferred, especially indenylLi.

Preferably, the molar ratio of ligand to transition metal component (b) in the catalyst is 0.03 to 5, more preferably is from 0.05 to 3, still more preferably from 0.07 to 2, especially 0.2 to 0.6 or 0.25 to 1.2.

In a preferred embodiment, in the Ziegler-Natta catalyst compound (b) is a transition metal compound of Group 4 to 6 of the Periodic Table (IUPAC). Preferably, the transition metal component (b) is a selected from Ti, Hf or Zr, most preferably it is Ti. Especially preferably, the Ti compound is a titanium halide, more preferably Ti tetrachloride.

Component (a) is preferably a compound of magnesium, e.g. a complex with alkoxy, ether, alkyl and/or halide groups, where any hydrocarbyl group present in the complex preferably is a $C_{1-20}$ hydrocarbon residue, e.g. $C_{1-15}$ group, preferably $C_{3-10}$ group, such as $C_{4-8}$ group, e.g. linear, cyclic or branched alkyl, aryl, aralkyl, or alkaryl, suitably a linear or branched alkyl, preferably a branched alkyl, such as 2-ethyl-1-hexyl, or ethyl, propyl, butyl, pentyl, hexyl, heptyl, octyl, which may optionally be substituted with halogen Component (d), is a compound of a Group 13 metal which s preferably an organoaluminium compound, more preferably an aluminium alkyl halide, aluminium alkyls, and aluminium alkoxy compound, preferably an Al compound having the formula Al(alkyl)$_x$Cl$_{3-x}$, where alkyl is an alkyl group with 1 to 12, preferably 1 to 8, more preferably 1 to 6 C atoms and 0<x<3, preferably x is 1.

It is also possible to use in addition to the above-mentioned compounds e.g. modifiers and the like in catalyst preparation, e.g. the catalyst compounds may be combined with different types of ethers, esters, silicon ethers and the like to further modify the activity and/or the selectivity of the catalyst, as is known in the art.

The catalyst component formed from at least compounds (a), (b) and (d) as well from the ligand compound (c), is prepared in an emulsion/solidification method, such as disclosed in general in WO 03/106510 of Borealis, e.g. according to the principles given in the claims thereof.

In addition to the above catalyst components (a) to (d) of the catalyst, the catalyst system comprises e.g. cocatalyst as discussed earlier. Cocatalysts are conventionally alkyl compounds of Group 13 metal, such Al as alkyl compounds.

Cocatalyst(s) are usually fed separately to the actual polymerization step. The cocatalyst is typically used in excess to the transition metal of the transition metal compound. For instance, when an aluminium alkyl is used as a cocatalyst, the molar ratio of the aluminium in the cocatalyst to the transition metal in the transition metal component is from 1 to 500 mol/mol, preferably from 2 to 100 mol/mol, more preferably from 5 to 50 mol/mol and in particular from 5 to 30 mol/mol.

In a highly preferred embodiment TIBA (tri-isobutyl aluminium) or TEA (triethyl aluminium) is used as cocatalyst. Most especially TIBA is used. It has been surprisingly found that when TIBA is used the HMW component formed in the gas phase has remarkably low density and that the overall polymer has even higher dart drop than achieved using other cocatalysts.

The emulsion/solidification method for preparing the catalyst used in the present invention preferably comprises:

preparing a common solution of compounds (a), (b) and (d) or separate solutions comprising one or more of compounds (a), (b) and (d);

dispersing said solution(s) in a solvent immiscible therewith and inert in relation to said compounds, to obtain an emulsion in which said solution(s) form(s) the dispersed phase in the form of droplets comprising compounds (a), (b) and (d);

solidifying the catalyst compounds in the dispersed droplets; and adding one or more ligand compound(s) (c) which is/are selected from organic compounds comprising a cyclopentadienyl anion backbone at any stage of the preparation into the dispersed phase before during or after the solidification step, however before the final recovery step.

Compound (c) is preferably added together with any of the compounds (a), (b) or (d).

This type of catalyst is disclosed in detail in EP application No 06014743.6, which is incorporated herein by reference.

Optionally, the obtained solidified catalyst compounds particles may be recovered. The solidified catalyst particles can be washed before the final recovery.

This process enables the manufacture of active catalyst particles with highly preferable morphology, e.g. with a predetermined spherical shape and uniform particle size distribution without using any added external porous support material, such as an inorganic oxide, e.g. silica. Also desirable surface properties can be obtained.

In a preferred method for forming the catalyst component, the compounds (a), (b), (c) and (d) may be combined into one solution which is dispersed in the immiscible solvent, or, alternatively, at least two separate solutions for each or part of said compounds may be prepared, which are then dispersed successively to the immiscible solvent.

The term "in a solvent immiscible therewith and inert in relation to said compounds" means herein that said solvent forming the continuous phase is chemically inert at least at the conditions (e.g. temperature) used during the dispersing step. Preferably, the solvent of said continuous phase does not contain dissolved therein any significant amounts of catalyst forming compounds (a), (b), (c) or (d). Thus, the solid particles of the catalyst are formed in the droplets from the compounds which originate from the dispersed phase (i.e. are provided to the emulsion in a solution dispersed into the continuous phase).

The term "emulsion" used herein covers both bi- and multiphasic systems.

As stated above, before the final recovery step the solid catalyst particles may be washed. The washed solid particles can be isolated and dried in a manner known in the art to obtain said catalyst as dried particulate solids. Another alternative is to slurry the solid catalyst particles after washing into an oily liquid to get a catalyst-oil-slurry, which can be used as such in polymerisation. The oily liquid comprises oil, petroleum or hydrocarbons or mixtures thereof, preferably hydrocarbon oils, such as white oils, which are mixtures of paraffinic and naphtenic hydrocarbons.

According to a preferred embodiment the catalyst component of the Ziegler-Natta catalyst of the invention is prepared by a method comprising the steps preparing a solution of the compound (a);

preparing a solution of compounds (d) and (c);

combining said two solutions with a solution of compound (b);

dispersing said obtained combined solution of (a), (b), (c) and (d) in a solvent immiscible therewith and inert in relation to said compounds to obtain an emulsion in which said solutions form the dispersed phase;

solidifying the catalyst component in the dispersed droplets;

optionally washing the solidified catalyst particles; and optionally recovering the solidified catalyst particles in solid form.

In a preferred embodiment of all the preparation alternatives, the catalyst particles are washed before the final recovery.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof, which means that said solvents may contain other functional groups and/or further halogens such chlorine, bromine and/or iodine.

Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and -cycloalkanes include perfluorohexane, -heptane, -octane and -(methylcyclohexane). Semi fluorinated hydrocarbons relates particularly to semifluorinated n-alkanes, such as perfluoroalkylalkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr.6, and of Pierandrea Lo Nostro in "Advances in Colloid and Interface Science, 56 (1995) 245-287, Elsevier Science.

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10000 and optionally interrupted with a heteroatom(s)), preferably halogenated hydrocarbons, such as semi- or highly fluorinated hydrocarbons optionally having a functional group selected e.g. from —OH, —SH, $NH_2$, —COOH, —$COONH_2$, cyclic ethers and/or any reactive derivative of these groups, like alkoxy or carboxylic acid alkyl ester groups, or, preferably semi-, highly- or perfluorinated hydrocarbons having a functionalised terminal, can be used.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, NH2, —COOH, —COONH2) cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. a compound (d) as defined below) and/or a transition compound (e.g. a compound (b) as defined below).

In a preferred embodiment a highly fluorinated C1-n (suitably C4-30- or C5-15) alcohol (e.g. highly fluorinated heptanol, octanol or nonanol) is added to a solution of a compound (a), compound (b), (d) and/or (c) to form the "actual" surfactant. The addition is preferably effected after a solution of compounds (a), (c), (d) and (b) as defined below, is dispersed to a solvent forming the continuous phase.

These and any further additives, and/or compounds can be, however, added to the system in any stage of the dispersing and/or solidification step, if needed.

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

The solidified catalyst particles may be subjected to washing step(s). The droplet shape of the particles may be substantially maintained. The formed particles may have an average size range of 1 to 500 µm e.g. 5 to 500 µm, advantageously 5 to 200 µm or 10 to 150 µm. Even an average size range of 5 to 60 µm is possible. The size may be chosen depending on the polymerisation the catalyst is used for. Advantageously, the particles are essentially spherical in shape, they have a low porosity and a low surface area.

The various possibilities of the compounds and combinations are within the skills of a person in the field.

The formation of solution of (a) and (d) with (c) can be effected at a temperature of 0-100° C., e.g. at 20-80° C. Preferably, the compound (b) is added at a lower temperature, e.g. at 0-30° C. The dispersion step may be effected at 0-100° C., e.g. at about 0-70° C., such as at 0-30° C.

In every preparation method as described above the compounds (a), (b), and (d) may be added in molar ratios known in the art, e.g in molar ratio of the element of Compound (d), e.g. Al, to the element of Compound (a), e.g. Mg, may be between 0.3:1 to 3:1, e.g. 0.5:1 to 2:1, the molar ratio of the element of Compound (b), e.g. Ti, to the element of compound (a), e.g. Mg, may be between 3:1 to 0.1:1, e.g. 2:1 to 0.2:1.

In one embodiment, the liquid catalyst is prepared by contacting a magnesium dihydrocarbyl compound, e.g. magnesium dialkyl, such as butyloctyl-Mg (BOMAG), with an alcohol ROH, wherein R is a hydrocarbyl group as defined above, e.g. 2-ethyl-1-hexanol. To this solution an aluminium compound of formula $Al(R)_xX_{3-x}$, wherein R, X and x are as defined above, preferably Al alkyl halide (e.g. chloride), such as $EtAlCl_2$, into which solution the ligand compound, as defined above, is added and further a titanium compound, such as $TiCl_4$, is added to the obtained solution. In case both the Al and the Ti compounds are added to Mg-ROH complex, then preferably the Al compound and ligand compound are added first. The solution may contain additional solvents as described above, e.g. an aliphatic or aromatic solvent, such as n-heptane or toluene. Said solution can be formed at a temperature range at 10-50° C., preferably at the ambient temperature at 10 to 30° C. The obtained solution is then dispersed, e.g. by mixing, to an immiscible solvent, e.g. to a perfluorinated hydrocarbon as defined above. The mixing is suitably carried out at room temperature, but e.g. lower or elevated temperatures may also be used.

To the obtained dispersion an emulsifying agent as defined above, such as a highly or perfluorinated hydrocarbon having a functional terminal, may be added to improve/stabilise the droplet formation. The solidification of the catalyst component in the droplets is preferably effected by raising the temperature of the mixture gradually, e.g. from the room temperature up to 100° C., e.g. up to 60-90° C., in 1 to 180 minutes, e.g. 1-90 or 5-30 minutes. Heating time is dependent on the size of the reactor.

In a further embodiment, a magnesium alkyl, as defined above is reacted with ROH as defined above, preferably in a solvent, like toluene and, an aluminium compound, such as an alkyl aluminium halide, e.g. $EtAlCl_2$, preferable dissolved in a solvent, like toluene, combined with a ligand compound is added, to form a first solution, which is dispersed to an inert solvent, such as perfluorinated hydrocarbon as defined above. To the obtained dispersed phase, $TiCl_4$ solution is then added separately. After the addition of $TiCl_4$ the solidification of the droplets of the dispersed phase is carried out by heating as described above and the solidified catalyst is optionally washed and recovered as described above. This embodiment, where TiCl4 is added separately, is the preferred one. Additional inert solvents as defined above can also be used in the formation of said solutions.

During the solidification step, which is preferably carried out at about 60 to 80° C., preferably at about 70 to 80° C., the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

Generally, in the final solid catalyst particles, the molar ratio of Mg:Ti can be e.g. between 10:1 to 1:10, preferably 7:1 to 1:5, more preferably 6:1 to 1:3. The molar ratio of Ti:Al can be e.g. between 10:1 to 1:4, preferably 5:1 to 1:3, more prererably 3:1 to 1:2. Furthermore, in case Compound (a) is prepared by contacting the Mg hydrocarbyl with an alcohol, suitably in a molar ratio of Mg^1 OH between 1:1 to 1:4, e.g. 1:1 to 1:3.5, such as 1:1.5 to 1:3.1.

The use of this catalyst material is advantageous in the present invention as the catalyst possesses high activity and allows the formation of polymers with good particle morphology. Moreover, the catalyst is useful for allowing the preparation of polymers of the invention where an extreme split at particular density is required. The catalyst in general seems to allow polymerisation over a broader processing window.

Compositions

The multimodal polymer of the invention can be combined with other polymer components, e.g. LDPE, LLDPE components or HDPE polymers to form a composition comprising the polymer of the invention. It is also possible to combine two polymers of the invention to make a highly preferred composition. Preferably however, no other polymer components are present and the multimodal polymer of the invention is the only polymer component used in the manufacture of a film (or layer of a film). The polymer can however form a composition with conventional additives such as antioxidants, UV stabilisers, acid scavengers, nucleating agents, anti-blocking agents as well as polymer processing agent (PPA).

Film Formation and Properties

The polymer of the invention can be in the form of powder or pellets, preferably pellets. Pellets are obtained by conventional extrusion, granulation or grinding techniques and are an ideal form of the polymer of the invention because they can be added directly to converting machinery. Pellets are distinguished from polymer powders where particle sizes are less than 1 mm.

The use of pellets ensures that the composition of the invention is capable of being converted in a film, e.g. monolayer film, by the simple in line addition of the pellets to the converting machinery.

For film formation using a polymer mixture it is important that the different polymer components be intimately mixed prior to extrusion and casting/blowing of the film as otherwise there is a risk of inhomogeneities, e.g. gels, appearing in the film.

The polymers of the invention have been found to allow the formation of films having an ideal balance of properties. They have excellent mechanical properties and are readily processed. In particular, films exhibit high dart impact strengths, high tear strengths, sealability and good processability.

The films of the invention are preferably monolayer films or the polymer of the invention is used to form a layer within a multilayer film. Any film of the invention may have a thickness of 10 to 250 µm, preferably 20 to 200 µm, e.g. 30 to 150 µm, more preferably e.g. 30 to 135 µm, or 30 to 60 µm.

The films of the invention can be manufactured using simple in line addition of the polymer pellets to an extruder. For film formation using a polymer mixture it is important that the different polymer components be intimately mixed prior to extrusion and blowing of the film as otherwise there is a risk of inhomogeneities, e.g. gels, appearing in the film. Thus, it is especially preferred to thoroughly blend the components, for example using a twin screw extruder, preferably a counter-rotating extruder prior to extrusion and film blowing. Sufficient homogeneity can also be obtained by selecting the screw design for the film extruder such that it is designed for good mixing and homogenising.

The film of the invention can be blown or cast, preferably blown. Blown films will typically be produced by extrusion through an annular die, blowing into a tubular film by forming a bubble which is collapsed between nip rollers after solidification. This film can then be slit, cut or converted (e.g. gusseted) as desired. Conventional film production techniques may be used in this regard. Typically the composition will be extruded at a temperature in the range 160° C. to 240° C., and cooled by blowing gas (generally air) at a temperature of 10 to 50° C. to provide a frost line height of 1 or 2 to 8 times the diameter of the die. The blow up ratio should generally be in the range 1.5 to 4, e.g. 2 to 4, preferably 2.5 to 3.

The film of the invention can also be a cast film. The cast film process involves the extrusion of polymers melted through a slot or flat die to form a thin, molten sheet or film. This film is "pinned" to the surface of a chill roll (typically water-cooled and chrome-plated) by a blast of air from an air knife or vacuum box. The film quenches immediately and then has its edges slit prior to winding. Because of the fast quenching step, a cast film generally has better optical properties than a blown film and can be produced at higher line speeds.

The films of the invention exhibit high dart impact strengths and tear strengths, especially in the machine direction. In the passages which follow, certain parameters are given based on a specific film thickness. This is because variations in thickness of the film cause a change to the size of the parameter in question. To obtain a quantitative value, a specific film thickness is therefore quoted. This does not mean that the invention does not cover other film thicknesses rather it means that when formulated at a given thickness, the film should have the given parameter value.

Thus for a 40 µm film of the invention manufactured as described below in the examples section Dart drop F50 (ISO 7765/1) may be at least 700 g, preferably at least 750 g, more preferably at least 800 g, especially at least 900 g. Some polymers of the invention exhibit dart drop values of over 1000 g.

In another embodiment, the dart drop F50 value should be at least 700 g for any film formed from a polymer of the invention having a thickness of 10 µm or more.

In another embodiment the ratio of the dart drop F50 value to film thickness should be at least 17.5 g/µm, preferably at least 20 g/µm, more preferably 22.5 g/µm, especially 25 g/µm.

Elmendorf Tear resistances in the machine direction for a 40 µm film manufactured as described below in the examples section may be at least 1.5 N.

The films of the invention, e.g. monolayer films may be laminated on to barrier layers as is known in the art. For food and medical applications for example, it may be necessary to incorporate a barrier layer, i.e. a layer which is impermeable to water and oxygen, into the film structure. This can be achieved using conventional lamination techniques. Suitable barrier layers are known and include polyamide, ethylene vinyl alcohol, PET and metallised Al layers.

Viewed from another aspect therefore the invention provides a laminate comprising a film as hereinbefore defined laminated onto a barrier layer.

In such an embodiment it may be convenient to laminate the barrier layer onto two monolayer films as hereinbefore described thereby forming a 3 layer structure in which the barrier layer forms the middle layer.

The films of the invention have a wide variety of applications but are of particular interest in packaging of food and drink, consumer and industrial goods, medical devices and in heavy duty packaging. Specific applications include industrial liners, heavy duty shipping sacks, carrier bags, bread bags and freezer bags.

Other Applications

The polymers of the invention may also be used in rotomoulding, injection moulding, blow moulding, extrusion coating and pipe formation.

The invention will now be described further with reference to the following non-limiting examples:

Analytical Tests

The following methods were used to measure the properties that are defined generally above and in examples below. The material and film samples used for the measurements and definitions were prepared as described under the particular method or in tables.

Density

Density of the materials is measured according to ISO 1183-1:2004 "Immersion method".

MFR

MFR2/5/21 are measured according to ISO 1133 at 190° C. at loads of 2.16, 5 and 21.6 kg respectively.

Dart Drop

Impact resistance is determined on Dart-drop (g/50%). Dart-drop is measured using ISO 7765-1, method "A". A dart with a 38 mm diameter hemispherical head is dropped from a height of 0.66 m onto a film clamped over a hole. If the specimen fails, the weight of the dart is reduced and if it does not fail the weight is increased. At least 20 specimens are tested. The weight resulting in failure of 50% of the specimens is calculated.

The films used in this test were produced as described below in the examples section. The thickness of the film was 40 µm.

Tear Resistance (Determined as Elmendorf Tear (N))

The tear strength is measured using the ISO 6383/2 method. The force required to propagate tearing across a film specimen is measured using a pendulum device. The pendulum swings under gravity through an arc, tearing the specimen from a pre-cut slit. The specimen is fixed on one side by the pendulum and on the other side by a stationary clamp. The tear strength is the force required to tear the specimen. The relative tear resistance (N/mm) is then calculated by dividing the tear resistance by the thickness of the film.

The films used in this test were produced as described below in the examples section. The thickness of the film was 40 µm.

Molecular Weights, Molecular Weight Distribution (Mn, Mw, MWD)

Mw/Mn/MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling in into the GPC instrument.

Xylene Solubles (XS) Content 2.0 g of polymer is dissolved in 250 ml p-xylene at 135° C. under agitation. After 30 minutes, the solution is allowed to cool for 15 minutes at ambient temperature and then allowed to settle for 30 minutes at 25° C. The solution is filtered with filter paper into two 100 ml flasks.

The solution from the first 100 ml vessel is evaporated in nitrogen flow and the residue is dried under vacuum at 90° C. until constant weight is reached.

$XS\% = (100 \times m \times v_0)/(m_0 \times v)$ $m_0$ = initial polymer amount (g)

m = weight of residue (g)

$v_0$ = initial volume (ml)

v volume of analysed sample ml)

Carbon Nuclear Magnetic Resonance (13C-NMR) Spectroscopy-Comonomer Content

13C-NMR analysis was used to determine the comonomer content of the samples. Samples were prepared by dissolving approximately 0.350 g of polymer and 2.0 ml of solvent in a 10 mm NMR tube. The solvent was a 90/10 mixture of 1,2, 4-trichlorobenzene and benzene-d6. Samples were dissolved and homogenised by heating the tube and its contents at 150 C in a heating block.

The proton decoupled carbon-13 single pulse NMR spectra with NOE (Nuclear Overhauser effect) were recorded on a Joel ECX 400 MHz NMR spectrometer. The acquisition parameters used for the experiment included a flip-angle of 45 degrees, 4 dummy scans, 3000 transients and a 1.6 s acquisition time, a spectral width of 20 kHz, temperature of 125° C., WALTZ decoupling and a relaxation delay of 6.0 s. The processing parameters used included zero-filling to 32 k data points and apodisation using an exponential window function with in 1.0 Hz artificial line broadening followed by manual zeroth and first order phase correction and automatic baseline correction.

Comonomer contents were calculated using integral ratios taken from the processed spectrum using the assignments described in J C. Randall's work (JMS-Rev. Macromol. Chem. Phys., C29(2&3), 201-317 (1989) using:

E=(\alphaB+\alphaH+\betaB+\betaH+\gammaB+\gammaH+\delta++)/2

B=(methine B+2B+1B)/3

H=(methine H+4H+3H+2H)/4 where methine is the CH branch site, alpha, beta, gamma the carbon sits adjacent to the CH i.e. CH, alpha, beta, gamma, delta delta. \delta++ is the bulk CH2 site and the 1,2,3 and 4 sites representing the various carbon sites along the branch with the methyl group being designated 1.
CE=100%*E/(E+B+H)
CB=100%*B/(E+B+H)
CH=100%*H/(E+B+H)
Haze-ASTM D1003

The films used in this test were produced as described below in the examples section. The thickness of the film was 40 μm.

EXAMPLE 1

Catalyst Preparation

Catalyst 1

Mg-Complex Formation: 40 kg of BOMAG (butyl octyl magnesium, 20wt % sol in toluene) was fed to a reactor. 12.4 kg of 2-ethylhexanol (2-EHA, dried on molecular sieves) was slowly added. The EHA/Mg molar ratio was 2. Reaction temperature was kept below 45° C. The solution was mixed for 30 minutes and cooled to room temperature.

Aluminium/Ligand Solution Preparation:

6.5 kg EADC (ethyl aluminium dichloride) was fed in a metallic cylinder. 0.173 kg of Indenyl Li (powder) was slowly added and mixed (by shaking) in order to have a complete dissolution.

Preparation of Catalyst

12 L of PFC ((perfluoro-1,3-dimethyl cyclohexane), dried over molecular sieves)) and 0.06L of surfactant ((3-(perfluoroctyl)-1,2-propenoxide, 97 wt % solution) was added in a reactor and mixed at 450 RPM at room temperature.

In a separate vessel, 1.5L of Mg complex prepared as above was added and 0.58L of Aluminium/Ligand solution (preparation described above) was slowly added to the Mg complex and mixed at 450 RPM for 30 min. After this mixing the solution of complexes was transferred to the vessel containing PFC/surfactant. The mixing speed was kept at 450 Rpm. Then after 15 min, 0.053L of $TiCl_4$ was added. After addition, the mixture was stirred during 15 min.

The emulsion was heated at 75° C. and mixed for 1 h at that temperature. After the catalyst was settled for 30 min at 75° C. and the PFC was removed. The catalyst was washed twice with 14L of heptane at 50° C. After the last washing the heptane was removed and then some primoil was added to obtain catalyst slurry in oil.

Polymerisation

The polymerisation were carried out in a two stage process comprising a slurry loop polymerisation followed by a gas phase polymerisation.

The first stage of the polymerisations below was carried out in a 500 dm³ loop reactor in the presence of ethylene, comonomer, propane and hydrogen in the amounts specified in table 1. The temperature was 85° C. The catalyst was added directly to the loop reactor as well as the cocatalyst. The cocatalyst TEA (or TIBA if stated) as 10 wt % solution in pentane) are further diluted with propane to have a final concentration between 1 and 2 wt %. The amount of cocatalyst fed is calculated in order to maintain an Al/Ti ratio of 20 mol/mol.

The polymer containing active catalyst was separated from the reaction medium and transferred to a gas phase reactor operated at 20 bar pressure and 85° C. where additional ethylene, hydrogen and comonomer were added and the amount are also specified in Table 1.

After the gas phase, the polymer was degassed and conveyed to the extruder.

Film Blowing for the Measurement of Dart Drop and Elmendorf Tear

The polymers of the invention were used to form films. 40 μm thick films (of the polymer in question) were blown on a Reifenhäuser monofilm line with extruder 25d, die diameter 250 mm, and die gauge 1.5 mm. The blow up ratio was 2.5:1, and frost line height, FLH, 600 mm. The temperature profile range was 180-210° C.

| | Loop Conditions | | | | |
|---|---|---|---|---|---|
| | C2 feed loop (kg/h) | H2 feed loop (g/h) | C4 feed loop (kg/h) | H2/C2 loop (mol/kmol) | C4/C2 loop (mol/kmol) |
| Cat 1 | 33.9 | 56 | 3 | 199 | 441 |
| Cat 1 | 33.7 | 57 | 3 | 171 | 437 |
| Cat 1 + TiBA | 33.4 | 59 | 3.3 | 169 | 411 |

| | Gas Phase Conditions | | | | | | |
|---|---|---|---|---|---|---|---|
| Type Catalyst | C2 feed GPR (kg/h) | H2 feed GPR (g/h) | C4 feed GPR (kg/h) | C6 feed GPR (kg/h) | H2/C2 GPR (mol/kmol) | C4/C2 GPR (mol/kmol) | C6/C2 GPR (mol/kmol) |
| Cat 1 | 51 | 0 | 1.1 | 21 | 1.2 | 29 | 236 |
| Cat 1 | 58 | 0 | 0 | 25.5 | 1.3 | 0 | 240 |
| Cat 1 + TiBA | 55 | 0 | 1.4 | 21 | 1.1 | 27 | 205 |

| Type Catalyst | MFR2 - Loop (g/10 min) | Density - Loop (kg/m3) | Split (% GPR) | Density GPR (g/cm3) | Density Pellets (g/cm3) | MFR 5 final (g/10 min) | $MFR_{21}$ g/10 min | Mw | Mn | MWD | XS (wt %) | C4-GPR (mol %) NMR | C6-GPR (mol %) NMR | Dart Drop (g) | MD Tear (N) | Haze |
|---|---|---|---|---|---|---|---|---|---|---|---|---|---|---|---|---|
| Cat 1 | 436 | 950.7 | 57 | 896.3 | 919.7 | 2.5 | 64 | 169000 | 9900 | 17.1 | 18.5 | 0.98 | 3.13 | 940 | 3.1 | 73 |
| Cat 1 | 336 | 950.7 | 60 | 896.2 | 918 | 1.3 | 31 | 182000 | 11000 | 16.9 | 17.4 | 0.45 | 3.12 | 1080 | 3.4 | 77 |
| Cat 1 + TiBA | 168 | 949 | 53 | 900.1 | 923.1 | 0.94 | 24 | 215000 | 11000 | 20.3 | 9.6 | 0.82 | 2.66 | 1090 | 2.1 | 85 |

The invention claimed is:

1. A process for the manufacture of a multimodal linear low density polyethylene polymer comprising:
   in a first stage polymerising ethylene and optionally at least one α-olefin in the presence of a Ziegler-Natta catalyst which comprises a solid catalyst component which is formed at least from
   (a) a compound of group 1 to 3 of the periodic table;
   (b) a transition metal compound of group 4 to 10 of the periodic table or an actinide or lanthanide;
   (c) a compound of group 13 of the periodic table;
   wherein the catalyst component of said Ziegler Natta catalyst is formed by an emulsion/solidification method, and is modified by one or more organic ligand compounds which are selected from organic compounds comprising a cyclopentadienyl anion backbone;
   so as to form 30 to 60 wt % of a lower molecular weight component (A) wherein (A) is an ethylene homopolymer or a copolymer of ethylene and at least one α-olefin; and
   transferring the product of the first stage to a second stage and
   in a second stage polymerising ethylene and at least one α-olefin in the presence of the same catalyst to form 70 to 40 wt % of a higher molecular weight component (B);
   wherein (B) is a copolymer of ethylene and at least one α-olefin, wherein said α- olefin is the same or different from any α-olefin used in component (A) but wherein both components (A) and (B) are not polymers of ethylene and butene alone;
   so as to form a multimodal linear low density polyethylene polymer which has a final density of 900 to 940 kg/m$^3$; and
   wherein the multimodal linear low density polyethylene polymer has a dart drop of at least 700g, and the molecular weight distribution of the multimodal linear low density polyethylene polymer is in the range 7 to 22.

2. A process as claimed in claim 1 wherein the final density of the polymer is 910 to 925 kg/m$^3$.

3. A process as claimed in claim 1 wherein said process is carried out in the presence of a cocatalyst and said cocatalyst is TIBA.

4. A process as claimed in claim 1 wherein the dart drop of the multimodal linear low density polyethylene polymer is at least 900 g.

5. A process as claimed in claim 1 wherein the LMW component forms 35 to 48 wt % of the multimodal linear low density polyethylene polymer and the HMW component forms 65 to 52 wt % of the multimodal linear low density polyethylene polymer.

6. A process as claimed in claim 1 further comprising forming said multimodal linear low density polyethylene polymer into an article.

7. A process as claimed in claim 6 wherein the article is a film.

8. A process as claimed in claim 7 wherein said film has a dart drop of at least 700 g.

* * * * *